United States Patent [19]

Sakata

[11] Patent Number: 4,732,230
[45] Date of Patent: Mar. 22, 1988

[54] CENTER BEARING AND SUPPORT MECHANISM FOR TWO-PIECE PROPELLER SHAFT

[75] Inventor: Tetsushin Sakata, Tokyo, Japan

[73] Assignee: Nissan Motor Co., Ltd., Yokohama, Japan

[21] Appl. No.: 851,100

[22] Filed: Apr. 14, 1986

[30] Foreign Application Priority Data

Apr. 23, 1985 [JP] Japan .................. 60-87252

[51] Int. Cl.$^4$ .............................. B60K 23/00
[52] U.S. Cl. .................................... 180/75.2
[58] Field of Search ............... 180/75.2, 312, 295, 180/299, 300; 248/635, 634, 638; 296/35.1

[56] References Cited

U.S. PATENT DOCUMENTS

| 2,906,572 | 9/1959 | Wroby | 180/75.2 |
| 2,935,362 | 5/1960 | Diener | 180/75.2 |
| 3,089,559 | 5/1963 | Rieck | 180/75.2 |
| 3,177,032 | 4/1965 | Jaskowiak | 296/35.1 |
| 3,219,138 | 11/1965 | Kishline | 180/75.2 |
| 4,240,517 | 12/1980 | Harlow, Jr. et al. | 180/295 |

FOREIGN PATENT DOCUMENTS

| 58-90831 | 6/1983 | Japan . | |
| 919090 | 2/1963 | United Kingdom | 180/75.2 |

Primary Examiner—John J. Love
Assistant Examiner—Karin L. Ferriter
Attorney, Agent, or Firm—Schwartz, Jeffery, Schwaab, Mack, Blumenthal & Evans

[57] ABSTRACT

In a center bearing and support mechanism for a two-piece propeller shaft, a center bearing surrounded by an insulator is supported at one of axially separated portions thereof on a frame of a vehicle chassis and at the other of the axially separated portions on a vehicle body so that vibrations of the propeller shaft are transferred through two paths to the vehicle body to be counterbalanced.

6 Claims, 7 Drawing Figures

CENTER BEARING AND SUPPORT MECHANISM FOR TWO-PIECE PROPELLER SHAFT

BACKGROUND OF THE INVENTION

1. Field of the Invention

The present invention relates in general to a propeller shaft support mechanism for use in an automotive vehicle of the kind having a chassis and a body resiliently supported on the chassis, as for example a truck, and more particularly to a center bearing and support mechanism for a two-piece or three-joint propeller shaft for use in a truck or the like vehicle.

2. Description of the Prior Art

An example of a prior art center bearing and support mechanism for a two-piece pro peller shaft requiring three universal joints for its connection is disclosed in Japanese Provisional Utility Model Publication No. 58-90381 and also shown in FIGS. 3 and 4. The mechanism includes a ball bearing 13 mounted on a two-piece propeller shaft adjacent a center universal joint and an insulator 14 made of soft resilient rubber. The bearing 13 and insulator 14 are supported on a vehicle frame 12 via an upper bracket 15 and a lower bracket 16.

With the prior art center bearing and support mechanism, variations of the angles of the universal joints cause a secondary couple from which vibrations of the propeller shaft 11 result. Such vibrations are transmitted through the bearing 13 and the insulator 14 to the vehicle frame 12, thus deteriorating the riding comfort of the vehicle. Vibrations transmitted to the vehicle frame 12 are enhanced upon acceleration of the vehicle at which the angles of the universal joints become larger. In the case of a truck in which a cab is resiliently supported on a chassis, such vibrations are transmitted to the cab. In order to solve the above problem, dynamic dampers can be used successfully. This however results in the increased weight of the vehicle.

SUMMARY OF THE INVENTION

In accordance with the present invention, there is provided a novel and improved center bearing and support mechanism which comprises a propeller shaft, a center bearing mounted on the propeller shaft, a frame constituting a vehicle chassis, a vehicle body resiliently supported on the frame, first support means interposed between the center bearing and the frame for resiliently supporting the former on the latter, and second support means interposed between the center bearing and the vehicle body for resiliently supporting the former on the latter.

The above structure is quite effective for overcoming the above noted disadvantages and shortcomings of the prior art mechanism.

It is accordingly an object of the present invention to provide a novel and improved center bearing and support mechanism for an automotive vehicle propeller shaft which can reduce vibrations transmitted from the propeller shaft to a vehicle body without causing substantial increase of the vehicle weight.

BRIEF DESCRIPTION OF THE DRAWINGS

The features and advantages of the center bearing and support mechanism will become more clearly appreciated from the following description taken in conjunction with the accompanying drawings, in which:

FIG. 8 is a sectional view of one embodiment of the invention as shown in FIG. 1.

DETAILED DESCRIPTION OF THE PREFERRED EMBODIMENT

Figure 1:
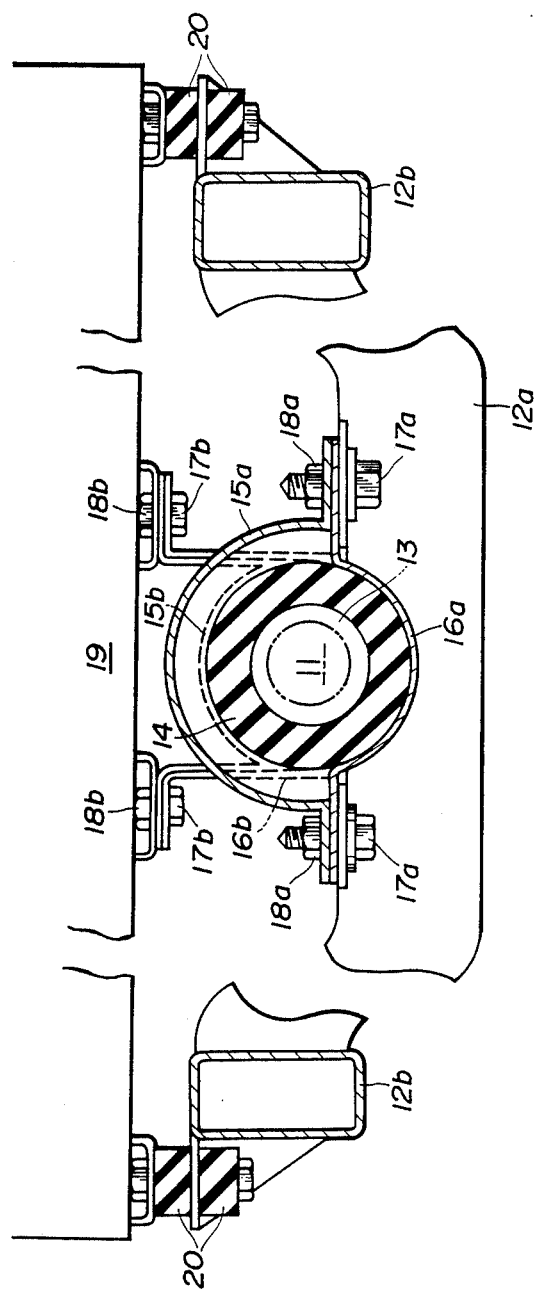
FIG. 1 is a sectional view of a center bearing and support mechanism for a two-piece propeller shaft according to an embodiment of the present invention.

Referring to FIG. 1, a center bearing and support mechanism is shown as being of the kind for use in a truck having a cab and a rear body.

Figure 2:
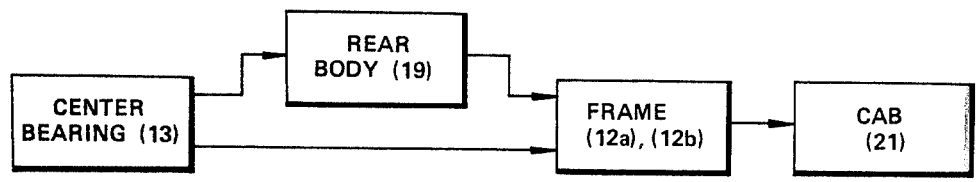
FIG. 2 is a block diagram of vibration transfer paths of the embodiment of FIG. 1.
Figure 3:
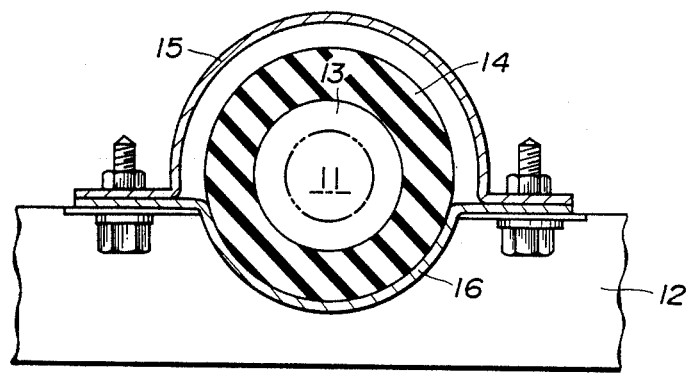
FIGS. 3 and 4 are sectional views of a prior art center bearing and support mechanism.
Figure 4:
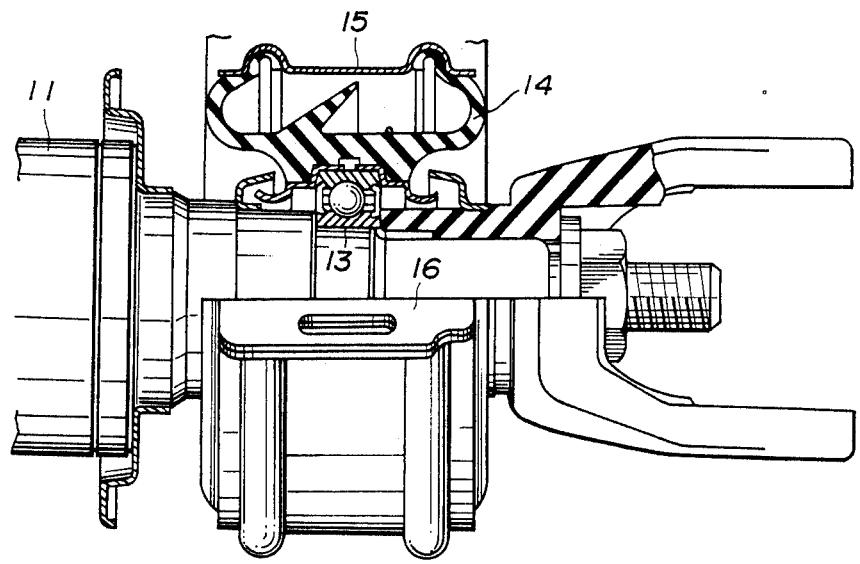

In FIG. 1, in which like or corresponding parts to those of the prior art system of FIGS. 3 and 4 are designated by like reference numerals, designated by the reference numeral 11 is a two-piece or three-joint propeller shaft using three universal joints for its connection, and by 13 a center bearing mounted on the propeller shaft 11 adjacent a center universal mounted on the propeller shaft 11 adjacent acenter universal joint (not shown) The center bearing 13 is located nearer to a transmission (not shown) with respect to the center universal joint similarly to the prior art arrangement of FIG. 3 and is fitted in or surrounded by a tubular insulator 14 made of soft resilient rubber. In this embodiment, the insulator 14 is adapted to serve as a first resilient member and a second resilient member. The insulator 14 is clamped at its forward axial portion (portion nearer to transmission) by a first upper bracket 15a and a first lower bracket 16a and at its rearward axial portion by a second upper bracket 15b and a second lower bracket 16b. The first upper bracket 15a and first lower bracket 16a are fixedly attached at the opposed ends thereof by bolts 17a to a frame cross member 12a constituting part of a vehicle chassis, while the second upper bracket 15b and second lower bracket 16b are fixedly attached at the opposite ends thereof by bolts 18b to a rear body 19 such as a freight bed. The rear body 19 is resiliently supported by way of rubber mountings 20 made of soft resilient rubber on a frame side member 12b integrally attached to the frame cross member 12a by for example welding. In the meantime, though not shown, on the frame cross member 12a and the frame side member 12b there is also supported a cab 21 (refer to FIG. 2).

The operation of the center bearing and support mechanism described as above will now be described hereinafter.

Figure 7:
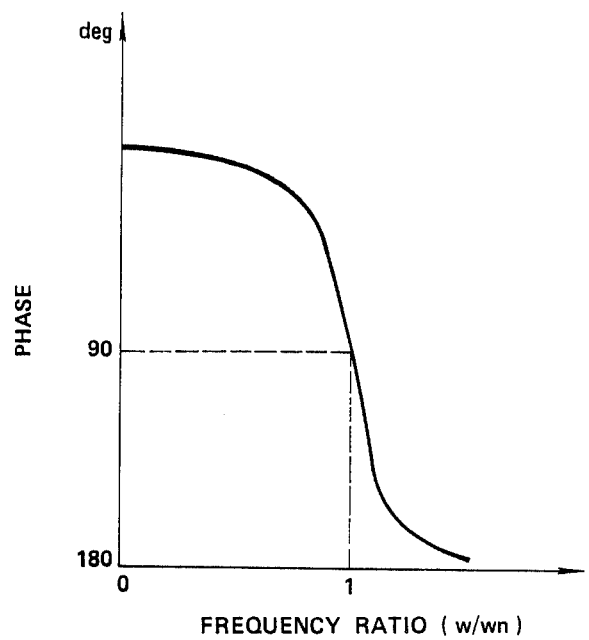
FIG. 7 is a graph of a phase of the vibration system of FIG. 5 as a function of a frequency ratio.
Figure 5:
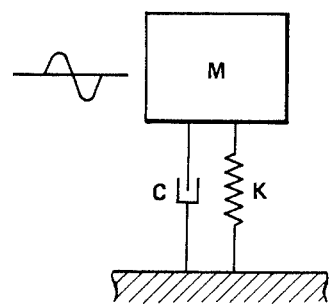
FIG. 5 is a diagrammatic view of a vibration system to which the center bearing and support mechanism of FIG. 1 can be approximated.
Figure 6:
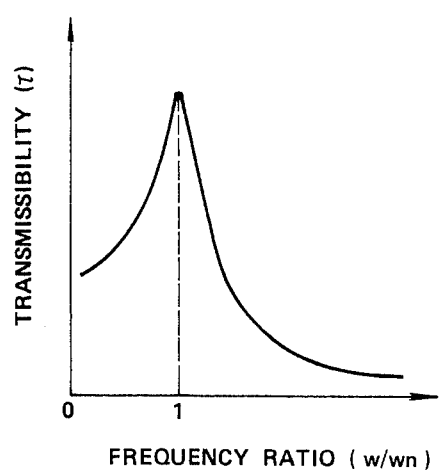
FIG. 6 is a graph of a transmissibility of the vibration system of FIG. 5 as a function of a frequency ratio.

In general, the center bearing and support mechanism can be approximated to such a free vibration system that is represented, as shown in FIG. 5, by a mass M, a damping coefficient C and a modulus of elasticity K. In this vibration system, a transmissibility $\tau$ becomes maximum at a resonant frequency as seen from the graph of FIG. 6, and 90° of phase delay is caused at the resonant frequency, which phase delay increases with increase of frequency as seen from FIG. 7.

In this connection, in the embodiment of the present invention, as shown in the block diagram of FIG. 2, vibrations of the propeller shaft 11 resulting from variations in the angles of the universal joints are transferred through the frame cross member 12b to the cab 21 (first transfer path) and on the other hand through the rear boy 19 and the frames 12a, 12b to the cab 21 (second transfer path). The vibrations transferred to the cab 21 via the second path can be, as apparent from FIG. 7, reverse in phase to the vibrations transferred via the first path when the resonant frequency of the vibration system including the rear body 19 is set so as to be within a low frequency range. Due to this, the vibrations transferred through the first path and the vibrations transferred through the second path are offset or counterbalanced to each other, thus making it possible to reduce vibrations transferred from the propeller shaft 11 to the cab 21.

Particularly, in the center bearing and support mechanism of this invention, when the freight weight or cargo weight increase to increase the angles of the universal joints, the mass of the rear body 19 is correspondingly increased to lower the resonance frequency of the vibration system having the rear body 19, whereby the aforementioned counterbalancing effect is further pronounced.

In this manner, the center bearing and support mechanism of the present invention can reduce vibrations transferred from the propeller shaft 11 to the cab 21 without using the dynamic dampers leading to increase of the vehicle weight but by supporting in parallel the center bearing 13 upon the frame cross member 12a and the rear body 19.

In the meantime, in the above described embodiment, the first resilient member and the second resilient member are constituted by the one-piece insulator 14, this is not limitative but they may be of independent parts of different resiliencies and supported on the frame cross member 12a and the rear body 19, respectively.

What is claimed is:

1. A center bearing and support mechanism comprising:
   a propeller shaft;
   a center bearing mounted on said propeller shaft;
   a frame constituting a vehicle chassis;
   a vehicle body resiliently supported on said frame;
   first support means interposed between said center bearing and said frame for resiliently supporting the former on the latter; and
   second support means interposed between said center bearing and said vehicle body for resiliently supporting the former on the latter.

2. A center bearing and support mechanism as set forth in claim 1, in which said propeller shaft is two-piece.

3. A center bearing and support mechanism as set forth in claim 2, in which said center bearing has axially separated peripheries and in which said first support means comprises a first annular resilient member surrounding one of said axially separated peripheries of said center bearing and a first pair of brackets clamping said first resilient member to attach the same to said frame, and said second support means comprises a second annular resilient member surrounding the other of said axially separated peripheries of said center bearing and a second pair of brackets clamping said second resilient member to attach the same to said vehicle body.

4. A center bearing and support mechanism as set forth in claim 3, in which said first and second resilient members are formed into a single piece.

5. In an automotive vehicle, a combination of a vehicle chassis having a frame, a vehicle body resiliently mounted on said vehicle chassis, a two-piece propeller shaft, a center bearing mounted on said propeller shaft, a resilient member surrounding said center bearing, a first bracket supporting said resilient member upon said frame, and a second bracket supporting said resilient member upon said vehicle body.

6. A center bearing and support mechanism for a vehicle having a cab and a rear body, comprising:
   a propeller shaft having a center bearing;
   a frame constituting a vehicle chassis, said cab and said rear body both resiliently and independently mounted on said frame;
   a first mount for resiliently supporting said center bearing on said frame; and
   a second mount for resiliently supporting said center bearing on said rear body such that the transfer of vibrations from said propeller shaft to said cab is prevented.

* * * * *